United States Patent
Broyer et al.

(10) Patent No.: US 7,134,445 B2
(45) Date of Patent: Nov. 14, 2006

(54) DOUBLE-EFFECT PYROTECHNIC MICROACTUATOR FOR MICROSYSTEM AND MICROSYSTEM USING SAME

(75) Inventors: Patrick Broyer, Beynost (FR); Bruno Colin, Marcy l'Etoile (FR); Denis Roller, La Ferte Alais (FR)

(73) Assignees: bioMerieux, Marcy L'Etoile (FR); SNPE Materiaux Energetiques, Paris (FR)

( * ) Notice: Subject to any disclaimer, the term of this patent is extended or adjusted under 35 U.S.C. 154(b) by 18 days.

(21) Appl. No.: 10/531,947

(22) PCT Filed: Nov. 18, 2003

(86) PCT No.: PCT/FR03/03404

§ 371 (c)(1),
(2), (4) Date: Apr. 19, 2005

(87) PCT Pub. No.: WO2004/048787

PCT Pub. Date: Jun. 10, 2004

(65) Prior Publication Data

US 2005/0257829 A1    Nov. 24, 2005

(30) Foreign Application Priority Data

Nov. 19, 2002  (FR) .................................. 02 14459

(51) Int. Cl.
*F16K 7/12*     (2006.01)
*F15B 15/19*    (2006.01)
*B81B 3/00*     (2006.01)

(52) U.S. Cl. .................. 137/68.13; 220/261; 251/331
(58) Field of Classification Search ............. 137/68.13; 220/261; 251/331
See application file for complete search history.

(56) References Cited

U.S. PATENT DOCUMENTS

| 3,184,097 | A | * | 5/1965 | Klimer et al. | 220/260 |
| 3,478,760 | A | * | 11/1969 | Hosek | 137/68.13 |
| 4,111,221 | A |   | 9/1978 | Olsen |  |
| 6,247,485 | B1 | * | 6/2001 | Rossi et al. | 137/68.13 |
| 6,994,030 | B1 | * | 2/2006 | Perut et al. | 102/202.5 |

FOREIGN PATENT DOCUMENTS

WO    WO 98/22719 A1    5/1998

* cited by examiner

*Primary Examiner*—Ramesh Krishnamurthy
(74) *Attorney, Agent, or Firm*—Oliff & Berridge PLC

(57) ABSTRACT

The invention concerns the technical field of micro-actuators used for mechanical, chemical, electrical or thermal functions in microsystems, for microelectronic applications such as chips, or biomedical functions such as microfluidics integrating cards. The invention concerns a micro-actuator comprising a so-called main chamber, made in a solid support and containing a so-called main pyrotechnic charge, the main chamber being sealed and delimited by solid support walls and by a deformable membrane, such that the gases emitted by the combustion of the main pyrotechnic charge, enable the volume of the chamber to be increased by deforming the membrane while maintaining intact the solid walls of the main chamber. The invention is characterized in that it comprises means for evacuating the gases from the main chamber.

21 Claims, 5 Drawing Sheets

DOUBLE-EFFECT PYROTECHNIC MICROACTUATOR FOR MICROSYSTEM AND MICROSYSTEM USING SAME

The technical field of the invention is that of microactuators intended to fulfill mechanical, chemical, electrical, thermal or fluidic functions in microsystems, for microelectronic applications, such as chips, or for biomedical applications, such as analysis cards integrating microfluidics or chemical synthesis such as microreactors.

BACKGROUND

Microactuators are miniaturized objects produced in solid supports, which may be semiconductors or insulators, for the purpose of forming microsystems such as, for example, microvalves or micropumps in fluid microcircuits, or microswitches in electronic microcircuits.

Microactuators using electrostatic, piezoelectric, electromagnetic and bimetallic effects have already existed for some time. A new generation of microactuators has started to appear, namely those using a pyrotechnic effect. In this regard, patent WO 98/22719 discloses a miniature valve for filling the reservoir of a transdermal administration device. The operating principle of this valve is based on the fragmentation of a substrate caused by the combustion gases from a pyrotechnic charge, said substrate initially separating a fluid reserve from an empty reservoir. This microvalve may, according to another embodiment, be used with an inflatable envelope. The combustion gases firstly cause the substrate to rupture and then the envelope to inflate for the purpose of pushing on a fluid so as to evacuate it. These microvalves have the double drawback of emitting substrate fragments into the microcircuit and of mixing the combustion gases with the fluid that they are supposed to release.

U.S. Pat. No. 4,111,221 discloses a non-miniaturized valve for interrupting, just once, the flow of a fluid between three concurrent ducts. This valve system includes a gas generator for inflating a bladder that is interposed at the intersection between the three ducts in order to completely close the fluid circuit. Various embodiments using in particular a piston that deforms the bladder under the action of gases are also present in the above document.

SUMMARY OF THE INVENTION

In general, the microactuators that are used in the microcircuits must be of high performance as regards the forces that they deliver, must be compact and must remain a single and autonomous entity during their operation, without the possibility of breaking up into pieces, in order to avoid particles being sent into the microcircuit into which they are integrated, and without any possibility of the combustion gases contaminating said microcircuit. In the case of a fluid microcircuit, the use of pyrotechnics allows microactuators to generate pressure forces 100 to 1000 times higher than those produced by microactuators operating on the basis of a piezoelectric or electrostatic source. In addition, the gases emitted by the combustion of the pyrotechnic charge may also serve to heat a fluid or part of a micromechanism, without being mixed therewith.

In some applications, it might also prove beneficial to have microactuators that can be reactivated in the reverse direction, for example in the case of a microvalve, after a fluid circuit has been opened or closed, in order to reopen or reclose, respectively, this fluid circuit.

The aim of the invention is therefore to propose a high-performance microactuator that is compact, remains an entire and autonomous entity during its operation, and can be activated in the reverse direction.

This aim is achieved by a microactuator comprising a chamber, called the main chamber, produced in a solid support and containing a pyrotechnic charge, called the main charge, said main chamber being hermetically sealed and bounded, on the one hand, by solid walls of the support and, on the other hand, by a deformable membrane, so that the gases emitted by the combustion of the main pyrotechnic charge cause the volume of said main chamber to increase by deforming said membrane, while leaving the solid walls of the main chamber intact, this microactuator being characterized in that it includes means for evacuating the gases from the main chamber.

In other words, the gases emitted by the combustion of the pyrotechnic charge have no influence on the geometry of the solid part of the chamber, whether by deformation of the walls or by fragmentation of the latter.

According to one feature, the means for evacuating the gases emitted by the combustion of the pyrotechnic charge are activated when the membrane is deformed. The reduction in deformation of the membrane then caused by the evacuation of a quantity of gas must be sufficient to activate in the reverse direction the microsystem in which the microactuator according to the invention is used.

These evacuation means can be actuatable upon command or, in a variant, when for example a threshold pressure is reached in the main chamber.

According to one embodiment, the gas evacuation means comprise an evacuation duct that runs at one end into the main chamber and at another end to the outside of the support, the duct being initially closed off during deformation of the membrane, the evacuation means also including means for opening the duct that are actuated in order to allow evacuation of the gases via the duct from the main chamber to the outside of the support and thus cause the membrane to return to its initial position, if said membrane is elastic.

According to a second embodiment, the gas evacuation means comprise at least one evacuation duct that runs at one end into the main chamber and at another end into another chamber, called the secondary chamber, which is hermetically sealed, the evacuation duct being initially closed off during deformation of the membrane, the evacuation means also including means for opening the duct, which are actuated in order to allow evacuation of the gases via the duct from the main chamber into the secondary chamber and thus reduce the deformation of the membrane sufficiently to activate in the reverse direction the microsystem in which the microactuator according to the invention is used.

Operation of the microactuator in these two embodiments, for example on a fluid microcircuit, allows the fluid microcircuit to be closed or opened and then this fluid microcircuit to be opened or closed, respectively.

According to one feature of these two embodiments, the gas evacuation duct is formed in the support.

According to one feature of the second embodiment, the secondary chamber is produced in the support.

According to another feature of these two embodiments, the evacuation duct is closed off by a plug.

According to one feature, the plug consists of a pyrotechnic charge.

According to an improved embodiment, another pyrotechnic charge, called the secondary pyrotechnic charge, is housed in one of the two chambers, this secondary pyrotechnic charge making it possible, during its initiation, after the reduction in deformation of the membrane caused by the evacuation of the gases in the secondary chamber, for the membrane to deform again. Thanks to this second pyrotechnic charge, the actuator may be reactuated once more.

The operation of a microactuator as defined above, and having the second feature, makes it possible, for example, to close a fluid microcircuit, then to open it, and then to close the microcircuit again. The reverse cycle—opening/closing/opening—may also be achieved by adapting the device.

According to a first embodiment, the various pyrotechnic charges, i.e. the main charge, the secondary charge and that constituting the plug, are each deposited on a conductive heating track with, for example, a deposition thickness of less than 200 µm.

According to a second embodiment of the invention, each of the pyrotechnic charges, main charge or secondary charge, encapsulates a conductive heating wire that passes through the chamber where it is located, the diameter of said wire being between 10 µm and 100 µm.

Although these two modes of initiation do allow in most cases the pyrotechnic charge in question to be ignited, a problem associated with conductive heat losses has nevertheless been observed in certain configurations, this problem being due to the conductive heating element being in contact with the support, these losses requiring additional energy in order to succeed in igniting the charge, this being in general accompanied by significant and systematically undesirable heating of the microactuator. Therefore, according to a third embodiment of the invention, the conductive heating track is deposited on the pyrotechnic charge using techniques widely proven in the field of microcircuits such as, for example, the deposition of a conductive paint or ink by screen printing or by inkjet, so as to avoid any direct contact between said heating track and the substrate.

According to one feature, each of the pyrotechnic charges, main charge or secondary charge, may be in the form of a film covering a cavity hollowed out in the support.

Thus, by isolating the pyrotechnic charge from any heat-conductive solid support, it is possible to reduce or even eliminate the conductive heat losses. For the latter configuration, energetic materials possessing a film-forming capability such as, for example, collodion may be used.

The configuration for best solving the problem associated with conductive heat losses therefore consists in depositing the pyrotechnic charge in the form of a film on a cavity of the support and in initiating it by means of a conductive heating track that is itself deposited on said charge. By this means, there are no direct contacts between the heating track and the support, and those between the charge and said support are virtually nonexistent.

Because of the miniaturization of the pyrotechnic charges, their initiation system must itself be compact, while continuing to be very reliable. More generally, it is also possible to initiate a pyrotechnic charge by other means, and especially those involving either a piezoelectric crystal or a striker pin, provided that they meet the two requirements of miniaturization and reliability, or by a laser beam, it then being possible for the light energy to be brought to the piezoelectric charge via a waveguide or an optical fiber.

Advantageously, the pyrotechnic charges, namely the main charge, the secondary charge and that constituting the plug, are formed by a nitrocellulose-based composition.

Because of the very small size of the pyrotechnic charges used—their mass does not exceed a few micrograms—it is particularly desirable to employ homogeneous compositions.

According to another preferred embodiment of the invention, the pyrotechnic charge is formed by glycidyl polyazide.

Preferably, the volume of the main chamber is less than 1 $cm^3$. Advantageously, the charging density, which is the ratio of the mass of the pyrotechnic charge to the volume of the chamber is between 0.01 $\mu g/mm^3$ and 0.1 $mg/mm^3$. For a given chamber volume, it is quite possible to define a pyrotechnic charge, in terms of mass, geometry and composition, capable of producing a given energy.

Preferably, the membrane is flexible and capable of being inflated under the effect of the gases emitted by the pyrotechnic charge. The extensibility properties of the membrane may vary depending on the requirements associated with the use of the actuator.

According to another preferred embodiment of the invention, the membrane is flexible and folded in said chamber, said membrane being capable of unfolding under the effect of the gases emitted by the pyrotechnic charge. Depending on the configuration, the membrane may either be folded on itself, or be folded into the chamber. Advantageously, once the membrane has unfolded under the effect of the gases, the final volume of the chamber is greater that its initial volume.

Preferably, the membrane is made of a plastic and/or elastic material, for example made of Teflon or latex. Advantageously, for applications in microelectronics, the membrane may be entirely or partly covered with a conductive material.

These microactuators may themselves fulfill functions within a microcircuit such as, for example, that of exerting pressure on a fluid, in order to help to move it or evacuate it, but more generally they are intended to be included in microsystems.

A microsystem is a miniaturized multifunctional device, the maximum dimensions of which do not exceed a few millimeters. Within the context of a fluid microcircuit, a microsystem may, for example, be a microvalve or a micropump, and within the context of an electronic microcircuit, a microswitch. The microactuators are produced in semiconductor supports, such as those made of silicon for example, for a microelectronic application. They may be designed in other materials, such as polycarbonate, for other applications and especially in the biomedical field. The conformation of the chamber is such that, under the effect of the gases emitted by the combustion of the pyrotechnic charge, it increases its volume. The chamber may contain several pyrotechnic charges, not for the purpose of increasing pressure inside said chamber by means of simultaneous ignition of said charges, but so as to maintain an approximately constant pressure level over time, in order to mitigate any premature relaxation of the chamber, especially in the case of micropumps. In this case, the charges are initiated sequentially, at predetermined time intervals. Preferably, said chamber defines a hermetically sealed space once it has expanded. In other words, once the combustion has been completed, the chamber remains in a configuration corresponding to a maximum expansion state.

The invention therefore also relates to a microsystem that includes a microactuator according to the invention, this microsystem being characterized in that it comprises a solid part, the deformation of the membrane causing displacement of the solid part. This is because the gases emitted by the combustion of the pyrotechnic charge create an overpressure in the chamber, which will have the tendency to expand by deformation of the membrane. The membrane then comes into contact with a part placed near the microactuator, and, when the compressive forces reach a threshold value, they cause displacement of said part.

According to a first preferred embodiment of a microsystem according to the invention, the solid part is capable of obstructing a fluid duct, as a result of said part pivoting under the effect of the combustion gases. For this configuration, in which the microactuator is used within the context of a fluid microcircuit, the microsystem may be likened to a shutoff microvalve.

According to a second preferred embodiment of a microsystem according to the invention, the solid part initially obstructs a fluid duct and the displacement of said part by pivoting causes said duct to open. For this configuration, the microsystem may be likened to an opening microvalve.

According to the invention, the microactuator also includes gas evacuation means for reducing the deformation of the membrane. Preferably, the opening of the evacuation duct allows the gases to be evacuated to the outside of the support or to a secondary chamber. The reduction in deformation of the membrane is sufficient to cause, according to the first embodiment, the fluid microcircuit to reopen, or, according to the second embodiment, the fluid microcircuit to close again.

According to the invention, one of the chambers may contain another pyrotechnic charge. This second pyrotechnic charge is intended to be initiated after the deformation of the membrane has been reduced, that is to say after the fluid microcircuit has been reopened in the case of the first embodiment, or after the fluid microcircuit has been closed again in the case of the second embodiment. The initiation of this second charge creates a gas overpressure in the two chambers, these being connected via the evacuation duct, which is open following the rupture of the plug. This overpressure creates a further deformation of the membrane, which then again moves the solid part so that the latter, in the case of the first embodiment, recloses the fluid microcircuit or, in the case of the second embodiment, opens the microcircuit again.

Advantageously, the solid part that obstructs the fluid duct is surmounted by a flexible protuberance in order to ensure proper sealing at the point where said duct is closed, said protuberance being likened to a plug.

According to a third preferred embodiment of a microsystem according to the invention i) a flexible membrane is located in an annular space that can be likened to a groove and constitutes the main chamber;
ii) the pyrotechnic charge is located in an annular space that can be likened to a groove of smaller dimension than that in which the flexible membrane is located, and positioned concentrically with respect to the latter, the two grooves communicating with each other via at least one opening; and
iii) a flat solid part bears against the support by covering the annular space in which the flexible membrane is located, said part being itself covered by an elastic membrane and obstructing a fluid duct, in such a way that the gases emitted by the combustion of the charge cause the flexible membrane located in the annular space to be deployed and cause the flat part to be displaced, resulting in fluid being drawn into the space that the elastic membrane creates when it moves away from the support.

For this configuration, the microsystem may be likened to a vacuum micropump and the use of several sequentially ignited pyrotechnic charges may appear to be particularly appropriate, so as to maintain a minimum threshold pressure level for a certain time, and therefore to avoid any premature natural reflux of the fluid.

According to the invention, the use of means for evacuating the gases to the secondary chamber may enable the deformation of the membrane to be reduced. After this reduction in the deformation of the membrane, the initiation of a second pyrotechnic charge, located in one of the two chambers, allows an overpressure to be created in the two chambers, which are connected via the evacuation duct. This overpressure causes a further deformation of the membrane and thus a further intake of fluid into the space that the membrane creates by moving away from the support.

The microactuator according to the invention may be used in electronic microcircuits, by contributing to the production of microsystems such as microswitches. This is because the membrane, which partly delimits the chamber and is entirely or partly covered with a conductive material, can be inflated or deployed so as to close or open an electrical microcircuit. Likewise, the microactuator according to the invention, provided with a nonconductive flexible membrane, can move a conductive solid part so as to close or open an electrical microcircuit or to provide the double function consisting in firstly opening an electrical microcircuit and then, thereafter, in closing another one.

The pyrotechnic microactuators according to the invention have the advantage of being of high performance and reliable, while remaining clean. They are clean on two counts: firstly, they remain intact throughout their operating phase, without any risk of being fragmented, preventing the release of parasitic solid particles into the microcircuit, and then the gases emitted by the pyrotechnic charge are trapped in the chamber that defines a hermetically sealed space, without any possibility of ingress into the microcircuit. In addition, the pyrotechnic microactuators according to the invention are simple. A chamber with a membrane, a pyrotechnic charge and an ignition system are their only constituent elements and the physico-chemical effects that they create remain basic.

Finally, for a given chamber volume, the great variability in the pyrotechnic compositions that may be integrated into the microactuators according to the invention makes it possible to obtain a very wide range of stresses. This thus allows the microactuators according to the invention to be used in a great number of configurations.

BRIEF DESCRIPTION OF THE DRAWINGS

A detailed description of a preferred embodiment of a microactuator according to the invention and three preferred embodiments of a microsystem using a microactuator according to the invention will be given below with reference to FIGS. 1 to 10.

DETAILED DESCRIPTION

Figure 1:
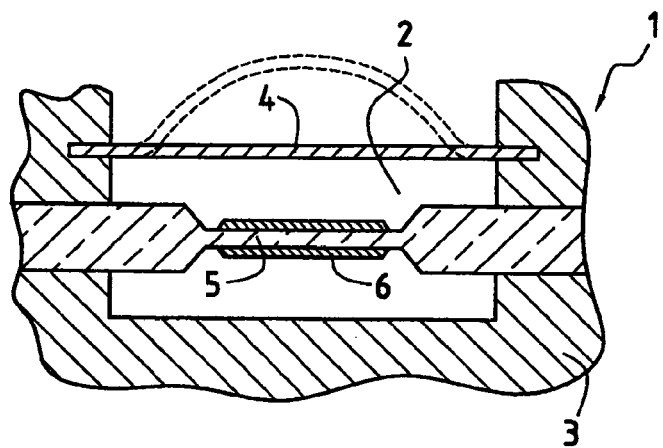
FIG. 1 is a longitudinal axial sectional view of a microactuator according to the invention.

Referring to FIG. 1, a microactuator 1 according to the invention comprises a chamber 2 made in a polycarbonate support 3 and having a cylindrical shape. Said support 3 results from a stack of polycarbonate sheets bonded together. In all the embodiments shown below, this stacking technique will be able to be used. The description that will be given below with reference to FIG. 2 will more particularly bring out this technique. Said chamber 2, which is therefore bounded by the support 3, has a circular face closed off by a flexible membrane 4, for example made of latex or Teflon, this membrane being fixed, for example by bonding, into said support 3. Passing through said chamber 2 is a heating wire 5 covered with a layer of nitrocellulose-based pyrotechnic composition 6. The diameter of the heating wire may for example be between 10 µm and 100 µm.

The way this actuator 1 operates is as follows. An electrical current is delivered into the heating wire 5, the temperature of which rises until it reaches the ignition temperature of the pyrotechnic composition 6. The combustion of said composition 6 generates gases that create an overpressure in the chamber 2. The membrane 4 thus stressed reacts by inflating.

As mentioned above, other modes of initiation may of course be envisioned. The pyrotechnic charge may in fact be deposited directly on a conductive heating track with a deposition thickness of less than 200 µm.

As stated in the introductory part of this description, certain heat losses may occur due to the conductive heating element being in contact with the support. In this case, the conductive heating track may be deposited on the charge so as to avoid any direct contact between said heating track and the substrate on which the charge is deposited. These conductive heat losses may also be reduced, for example by covering a cavity hollowed out in the support with the aid of the charge. The charge then for example will be in the form of a film and the conductive track will be deposited directly on the charge. In this configuration, it should be noted that there are no direct contacts between the heating track and the support, and those between the charge and said support are virtually nonexistent owing to the presence of the cavity.

Figure 2:
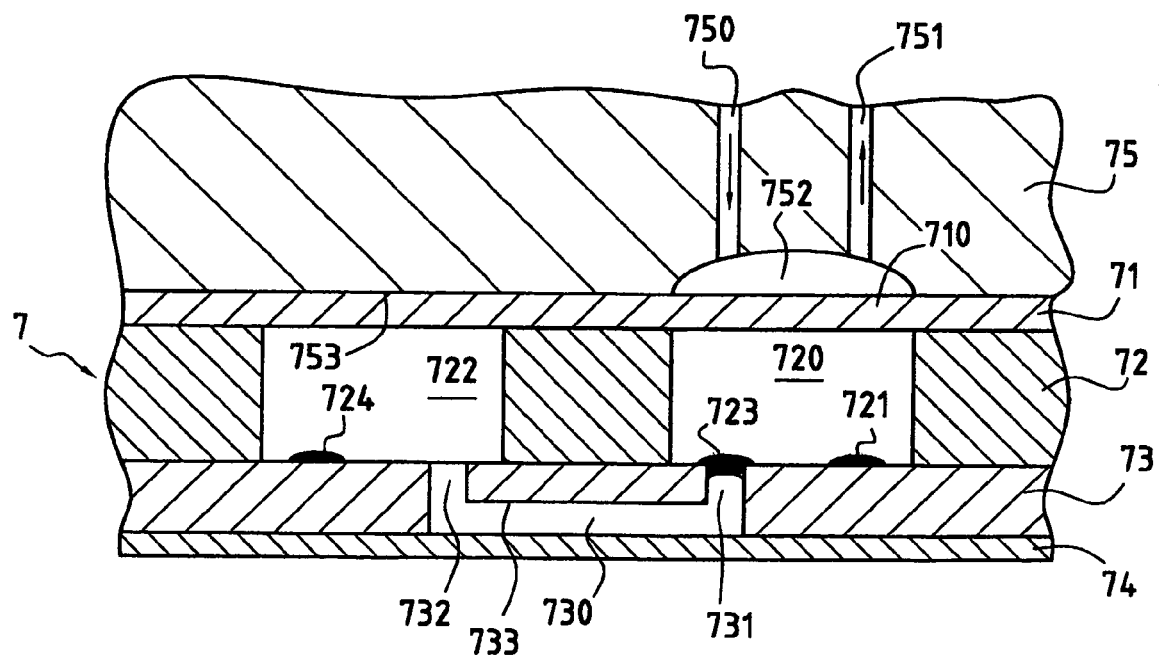
FIG. 2 is a longitudinal axial sectional view of a microvalve for carrying out a closing/opening/closing cycle, the microvalve operating by means of an improved microactuator according to the invention.

FIG. 2 shows an improved microactuator 7 for obtaining a deformation of the membrane as described with reference to FIG. 1 and a reduction in this deformation. In FIG. 2, this microactuator 7 acts as a microvalve in a fluid microcircuit. The microactuator 7 according to the invention consists of four superposed layers, 71, 72, 73 and 74, called respectively the first layer, the second layer, the third layer and the fourth layer. The second, third and fourth layers 72, 73 and 74 constitute the support and are made for example of polycarbonate. The first layer 71 is made of a plastic and/or elastic material, for example Teflon or latex. A fifth layer 75 constituting the fluid microcircuit is present on the first layer 71 of the microactuator 7. Passing transversely through this fifth layer 75 formed by the fluid microcircuit are two ducts 750 and 751. The two ducts 750 and 751 have one end that runs into a recess 752 formed in the face 753 of this fifth layer 75, called the lower face, located facing the first layer 71 of the microactuator 7. The two ducts 750 and 751 therefore communicate via the recess 752. The first duct 750 constitutes for example an inlet for fluid to enter the recess 752 and the second duct 751 constitutes an outlet for fluid to leave the recess 752.

The first layer 71 of the microactuator constitutes a deformable membrane 710 such as that described by the reference 4 in FIG. 1. Since the membrane 710 is fastened to the lower face 753 of the fifth layer 75, for example by bonding, deformation of the membrane 710 can only take place in the recess 752 of the fifth layer 75. This deformation may for example be due to an inflation.

The second layer 72 consists of a sheet drilled transversely by two holes and having a thickness for example of 0.5 mm. The side walls of a first hole define, with the first layer 71 located above and with the third layer 73 located below, the main combustion chamber 720 of the microactuator, such as that described with reference to FIG. 1. This main chamber 720 therefore contains the pyrotechnic charge 721, called the main charge, allowing the membrane 710 to be deformed. This main pyrotechnic charge 721 can be initiated according to one of the methods mentioned above, that is to say by means of a heating wire or a conductive track (neither being shown in FIG. 2). The main chamber 720 will for example have a diameter of 0.8 mm. The side walls of a second hole define, with the first layer 71 located above and with the third layer 73 located below, a secondary chamber or reservoir 722, the role of which will be explained hereafter. This secondary chamber 722 will for example have a diameter of 2 mm.

The third layer 73 consists of a sheet through which a U-shaped duct 730 is formed, each of the ends of said duct leading into one of the chambers 720 and 722 of the second layer 72. This duct 730 consists of a channel 733 hollowed out in that face of the third layer 73 located opposite the fourth layer 74 and covered by the fourth layer 74 of the microactuator 7. Each end of the channel 733 is extended perpendicularly by a conduit 731 and 732, each of the conduits 731 and 732 running into a chamber 720 and 722 of the second layer 72 of the microactuator. This fourth layer 74 is formed from a sealing film covering the duct 730.

The conduit 731 of the duct 730 running into the main chamber 720 is initially closed off in a sealed manner, for example by a plug 723. Communication between the two chambers 720 and 722 is therefore impossible.

A microvalve as shown in FIG. 2 operates as follows.

An electrical current is delivered into the heating wire or the conductive track until the temperature reached is sufficient to ignite the main pyrotechnic charge 721 contained in the main chamber 720. The combustion of the main pyrotechnic charge 721 generates gas in the main chamber 720 so as to create an overpressure in this chamber 720. The overpressure causes the membrane 710 to deform. The membrane 710, in response to the gas pressure, can deform only in the direction of the recess 752 formed in the fifth layer 75. The membrane therefore inflates so as to press against the bottom of the recess 752 and thus be interposed between the two ducts 750 and 751. The fluid microcircuit is therefore closed, and this closure is maintained thanks to the pressure of the gases contained in the main chamber 720 on the deformable membrane 710. The pressure of the gases contained in the main chamber 720 is sufficient to press the membrane 710 against the bottom of the recess 752 and is bigger than the backpressure exerted on the membrane 710 by the fluid contained in the microcircuit so as to keep the membrane 710 against the bottom of the recess 752.

The plug 723 still closes off the duct 730 connecting the two chambers 720 and 722. This plug 723 consists, for example, of a pyrotechnic charge that is deposited on the third layer 73, over the inlet of the conduit 731 of the evacuation duct 730. This pyrotechnic charge may be initiated by the various methods indicated above. Initiation of this charge allows the inlet of the duct 730 connecting the two chambers 720 and 722 to be opened. The gases generated by the combustion of the pyrotechnic charge formed by the plug 723 add to the gases already present, resulting from the combustion of the main pyrotechnic charge 721. Since the secondary chamber 722 is at a pressure below the pressure in the main chamber 720, the gases contained in the main chamber 720, that is to say those resulting from the combustion of the main pyrotechnic charge 721 and those resulting from the pyrotechnic charge formed by the plug 723, can flow out via the duct 730 into the secondary chamber. The volume of the secondary chamber 722 is sufficient to obtain a gas pressure between the two chambers 720 and 722 that is below the backpressure exerted on the membrane 710 by the fluid contained in the microcircuit. Thus, the reduction in gas pressure causes a reduction in the deformation of the membrane 710 sufficient to free the orifices formed by the ducts 750, 751 of the fluid microcircuit. This deformation of the membrane 710, toward the outside of the recess 752, causes the valve to open and therefore brings the two ducts 750 and 751 of the fluid microcircuit into communication.

According to an alternative embodiment, it would also be possible to purge the gases contained in the main chamber 720 directed to the outside of the device by bringing the main chamber 720 into communication with the open air. According to this embodiment, the membrane 710, if is it elastic, resumes its initial position.

According to the invention, the pyrotechnic charge constituting the plug 723 may be initiated upon command by an operator and/or when a threshold pressure is reached in the main chamber 720.

According to the invention, another pyrotechnic charge 724, called the secondary charge, may be placed in one of the chambers, either the main chamber 720 or the secondary chamber 722. In FIG. 2, the secondary pyrotechnic charge 724 is placed in the secondary chamber 722. This pyrotechnic charge 724 may be initiated in one of the modes mentioned above, that is to say by means of a heating wire or a conductive track.

According to the invention, after the two chambers 720 and 722 have been brought into communication, initiation of this further pyrotechnic charge 724 will create a gas overpressure inside the two chambers 720 and 722, which are now communicating. This gas overpressure inside the two chambers 720 and 722 causes a further deformation of the membrane 710. The membrane 710 can deform only into the recess 752 created in the fifth layer 75. The membrane therefore inflates inside the recess due to the pressure of the gases until it is pressed against the bottom of the recess 752 and closes off the end of the ducts 750 and 751 leading into the recess 752. The gas pressure inside the two chambers 720, 722 is again sufficient to deform the membrane 710 and greater than the backpressure exerted on the membrane 710 by the fluid contained in the microcircuit.

According to the invention, the main and secondary pyrotechnic charges 721 and 724 used will be placed in the chambers in a sufficient amount to allow deformation of the membrane and to prevent any deterioration of the material. They will for example be deposited on the third layer (73) and initiated by one of the modes mentioned above.

The mass of the main pyrotechnic charge 721 will depend on the volume of the main chamber 720 in which it is found, on the volume of gas needed to deform the membrane 710 and on the backpressure exerted on the membrane 710 by the fluid contained in the microcircuit. Likewise, the mass of the secondary pyrotechnic charge 724 will depend on the volume of the two chambers 720 and 722, on the mass of the main pyrotechnic charge 721 and on the mass of the pyrotechnic charge constituting the plug 723. These two charges, and that constituting the plug 723, are deposited on the third layer, for example each on a separate cavity in order to avoid conductive heat losses.

According to the invention, it is also possible to provide a number of other chambers, of the type of the secondary chamber 722, these being connected to the main chamber 720 via a duct initially closed off by a pyrotechnic charge, this number depending on the number of closing/opening cycles that it is desired to produce. The volume of these chambers must increase so as to be able always to obtain, on opening one of them, a gas pressure in all the communicating chambers that is below the backpressure exerted on the membrane 710 by the fluid contained in the microcircuit. The masses of the pyrotechnic charges, contained in the chambers and allowing, after the microcircuit has been opened, a further deformation of the membrane 710, must also increase so as to always be able to generate the necessary amount of gas in order to obtain, in the communicating chambers, a pressure high enough to cause the further deformation of the membrane 710 and greater than the backpressure exerted on the membrane 710 by the fluid contained in the microcircuit.

Figure 3:
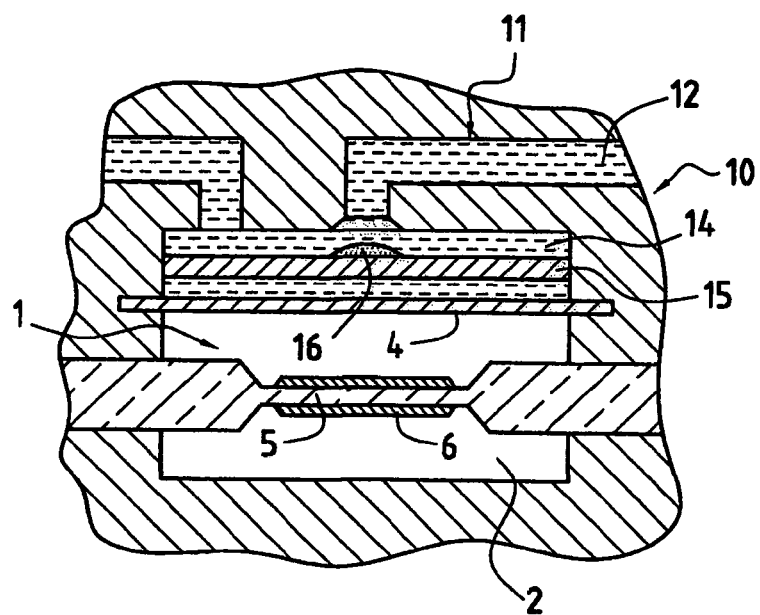
FIG. 3 is a longitudinal axial sectional view of a shutoff microvalve operating by means of a pyrotechnic microactuator as shown in FIG. 1.
Figure 4:
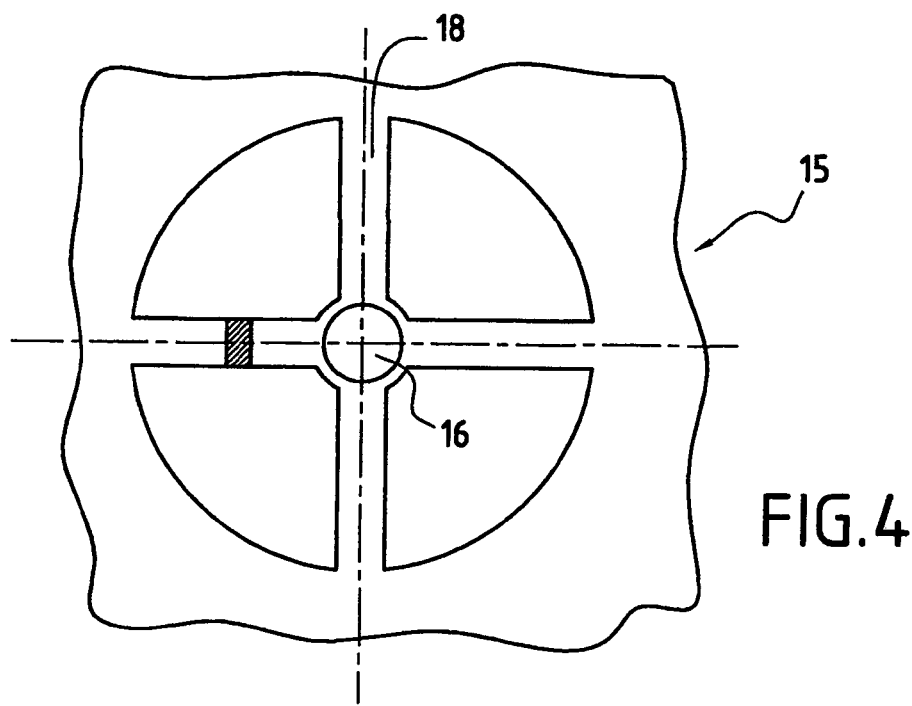
FIG. 4 is a top view of the closure flap of the microvalve of FIG. 3.

FIG. 3 shows a shutoff microvalve 10 produced in a polycarbonate support and comprising a microactuator 1 similar to that described with reference to FIG. 1 and located near a fluid microcircuit 11. This fluid microcircuit 11 has a straight duct 12 passing through a cylindrical chamber 14 located in the extension of the cylindrical chamber 2 of the microactuator 1, and having approximately the same diameter, the two chambers 2, 14 being separated from each other by the membrane 4 of the microactuator 1. The chamber 14, through which the duct 12 passes, is filled with fluid and contains a closure flap 15. Shown in FIG. 4, the flap 15 is formed by a flat solid part pierced transversely by a circular hole. Two orthogonal branches 18 attached to the solid part follow two diameters of the hole. A rounded part 16 is placed at the intersection of these two branches 18. The fluid can flow between the membrane 4 and the duct 12, passing between the branches of the solid part supporting the rounded part 16. Said rounded part 16, which is made of a flexible material, such as rubber, is therefore not in direct contact with the membrane 4. The volume of the chamber 2 is 0.3 mm$^3$ and the mass of the pyrotechnic charge 6 is 0.5 µg.

The mode of operation of this shutoff microvalve 10 is the following. The ignition of the pyrotechnic charge 6 results in an overpressure in the chamber 2 that then causes the translational displacement of the flap 15 into the fluid-filled chamber 14. This displacement continues until the flexible part 16 is embedded in the duct 12, cutting off the flow of fluid. That portion of the duct intended to receive the flexible part 16 is slightly flared so as to ensure sealed closure of the duct. Once the combustion of the pyrotechnic charge 6 is over, the flap 15 does not return to its initial position since the chamber 2 defines a hermetically sealed space.

According to the invention, evacuation of the gases to the outside or to a secondary chamber of the type of that described with reference to FIG. 2 may also be envisioned for this embodiment. In this case, as in the microvalve as shown in FIG. 2, the evacuation of the gases to the outside of the support or the reduction in pressure of the gases caused by the main chamber 2 being brought into communication with a secondary chamber will result, under the pressure of the fluid contained in the microcircuit, in a sufficient reduction of the deformation of the membrane 4 and thus the reopening of the duct 12. If the gases are evacuated into a secondary chamber, as in the embodiment described with reference to FIG. 2, a second pyrotechnic charge may be provided inside one of the chambers so as to obtain, after it has been initiated, a further deformation of the membrane 4. Initiation of this second pyrotechnic charge generates a new overpressure in the two communicating chambers and therefore causes the membrane 4 to deform again. This new deformation will continue until the rounded part 16 is embedded in the flared portion of the duct 12, in order to close it off again. With these modifications, the microvalve 10 will be capable of carrying out a closing/opening/closing cycle on the duct 12.

As described above, it is also possible, for this microvalve 10, to provide a number of other chambers of the type of the secondary chamber 722, this number depending on the number of closing/opening cycles that it is desired to carry out.

Figure 5:
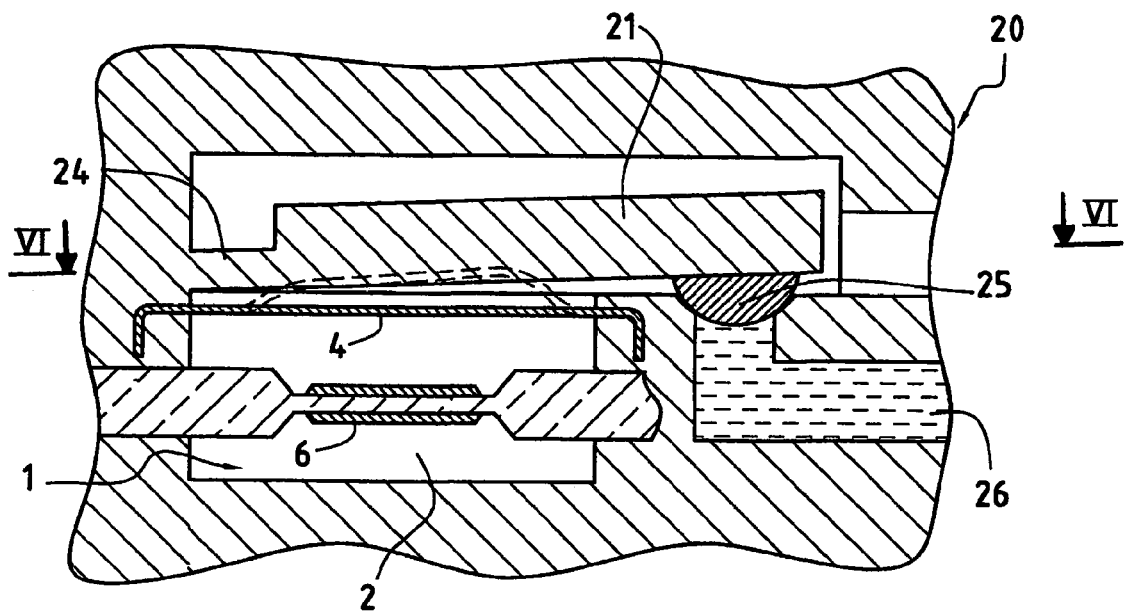
FIG. 5 is a longitudinal axial sectional view of an opening microvalve operating by means of a pyrotechnic microactuator as shown in FIG. 1.
Figure 6:
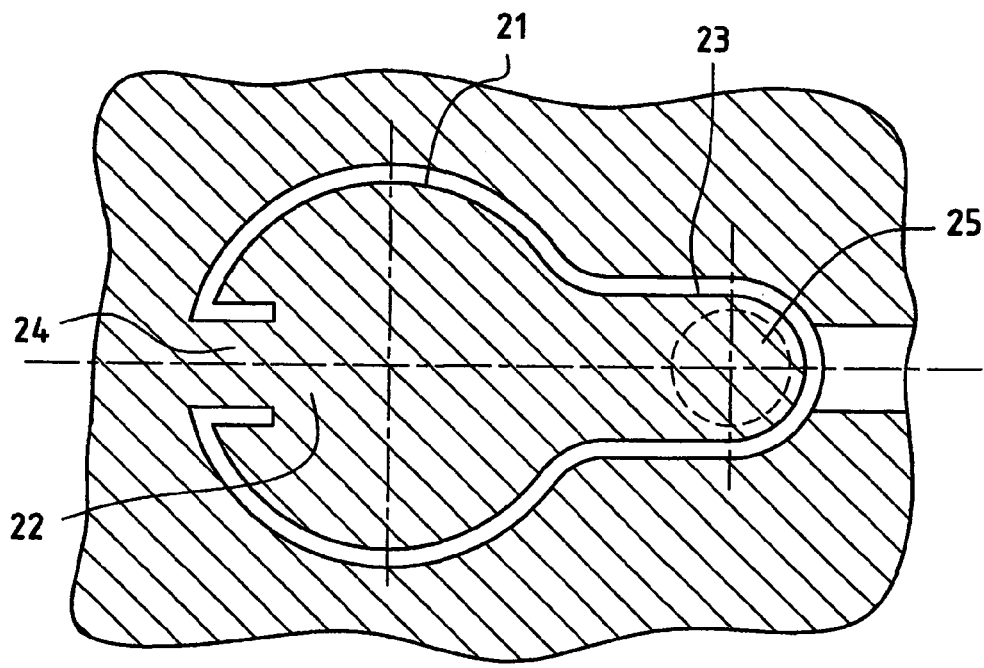
FIG. 6 is a sectional view on the plane VI—VI of the opening microvalve of FIG. 5.

As shown in FIG. 5, an opening microvalve 20 is produced in a polycarbonate support and comprises a microactuator 1 similar to that described in the section relating to FIG. 1 and located near a fluid microcircuit. Placed in the immediate vicinity of said microactuator 1, and more particularly of its membrane 4, is a flexible polycarbonate blade 21 integral with the support, made of the same material. FIG. 6 shows that the flexible blade 21 is a flat part of constant thickness, having a rounded body 22 extended by a narrower elongate portion 23 having a rounded end. The blade 21 is attached to the support via a tongue 24, of smaller thickness. More precisely, this tongue 24 connects said support to the end of the rounded body 22 of the blade 21, i.e. the end furthest away from the rounded end of the narrower portion 23 that extends it. The rounded end of said narrow portion 23 bears a flexible protuberance 25 of approximately hemispherical shape, said protuberance 25 closing off a duct 26. The force needed to maintain sealing, even in the event of a backpressure due to the fluid in the duct 26, is obtained by the initial flexure of the blade 21.

The mode of operation of this opening microvalve 20 is as follows. Ignition of the pyrotechnic charge 6 results in an overpressure in the chamber 2, which then causes the membrane 4 to inflate, which membrane then bears against the flexible blade 21. The inflated membrane 4 is shown by the dotted lines in FIG. 5. The compressive forces exerted on said blade 21 cause it to pivot around the tongue 24 which joins it to the support, allowing the duct 26 initially closed off by the protuberance 25 of said blade 21 to open. During its displacement, the blade 21 remains rigid, without deforming, and therefore acts as a pivoting flap.

According to the invention, gas evacuation to the outside or to a secondary chamber of the type described with reference to FIG. 2 may also be envisioned for this embodiment. In this case, as in the microvalve shown in FIG. 2, the evacuation or reduction in pressure of the gases will cause a reduction in the deformation of the membrane 4 and therefore, in this case, unlike the microvalve described with reference to FIG. 3, again close the duct 12. Likewise, as in the embodiment shown in FIG. 2 and FIG. 3, a second pyrotechnic charge located in the secondary chamber formed in the support may be initiated so as to obtain a further deformation of the membrane 4. This further deformation of the membrane causes the duct 26 to reopen. With these modifications, the microvalve 20 will be capable of carrying out an opening/closing/opening cycle on duct 26.

As described above, it is also possible, for this microvalve 20, to provide a number of other chambers of the type of the secondary chamber 722, this number depending on the number of opening/closing cycles that it is desired to carry out.

Figure 7:
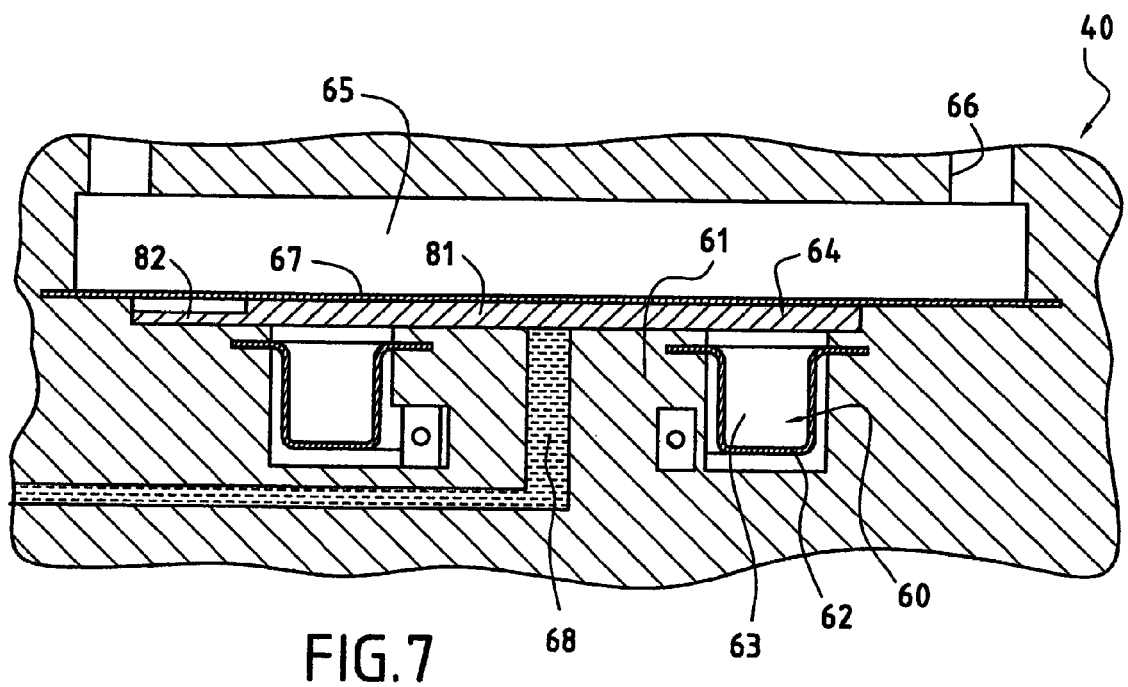
FIG. 7 is a longitudinal axial sectional view of a micropump using a pyrotechnic microactuator as shown in FIG. 1, said microactuator not yet having operated.

FIG. 7 shows a vacuum micropump 40, comprising a microactuator 60 according to the invention produced in a polycarbonate support 61, for example by stacking and bonding of sheets, and including a flexible membrane 62 located in an annular space 63 that can be likened to a groove. More precisely, said membrane 62 lines the bottom of the groove 63, being attached to said groove 63 in its upper portion. A pyrotechnic charge is located in an annular space that can be likened to a groove of smaller dimension than that 63 in which the membrane 62 is placed, and positioned relative to the groove 63 in a concentric manner, the two grooves communicating with each other via four uniformly spaced-apart openings in a circular wall separating the two grooves. The groove containing the pyrotechnic charge is buried in the support 61, whereas the groove 63, which is lined by the flexible membrane 62, is open in its upper portion. A sheet 64 of the polycarbonate support 61 covers said groove 63. Provided on the other side of the sheet 64, in the support 61, is a cylindrical open space 65, the diameter of which is greater than that of said sheet 64, said space 65 possessing two vents 66. The sheet 64 is covered with an elastic membrane 67, of circular shape and of diameter greater than that of the open space 64 located beyond said sheet 64. Said elastic membrane 67 is fastened in said open space 65 in its portion closest to the sheet 64. A fluid duct 68, hollowed out in the support 61 in the central portion of the groove containing the pyrotechnic charge, runs into the open space 65 in said support 61.

Figure 8:
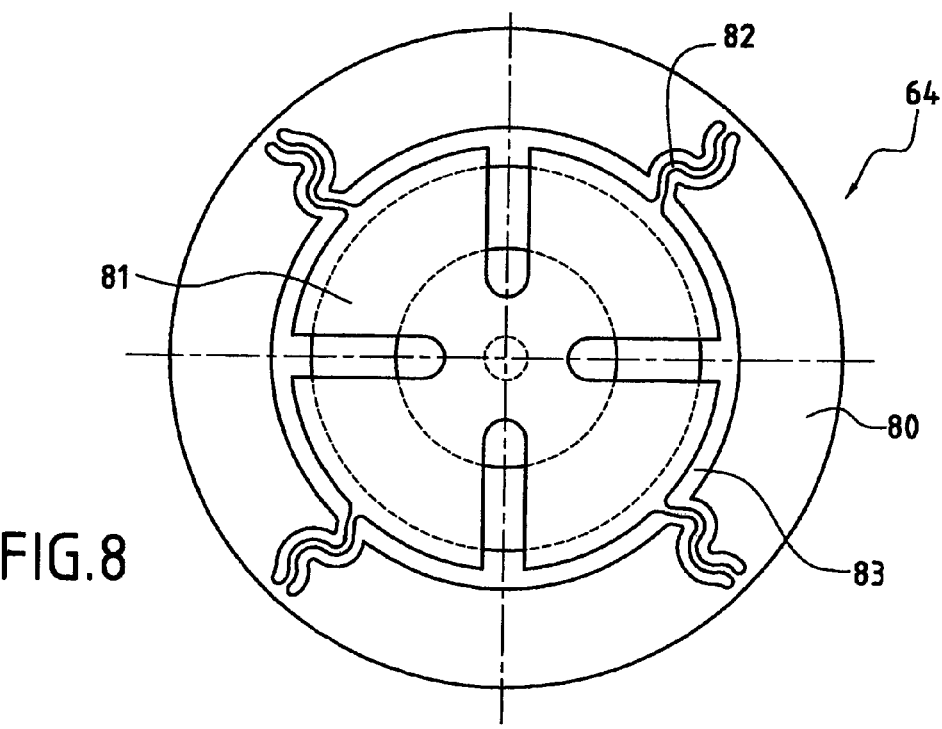
FIG. 8 is a top view of a flat displaceable solid part belonging to the micropump shown in FIG. 7.

As shown in FIG. 8, said sheet 64 is cut in such a way that it consists of a flat, peripheral, annular band 80 connected to a central flat disk 81 by means of four S-shaped deformable strands 82. The central disk 81 entirely covers the annular groove 63. An empty annular space 83 is left between said central flat disk 81 and the peripheral annular band 80.

Figure 9:
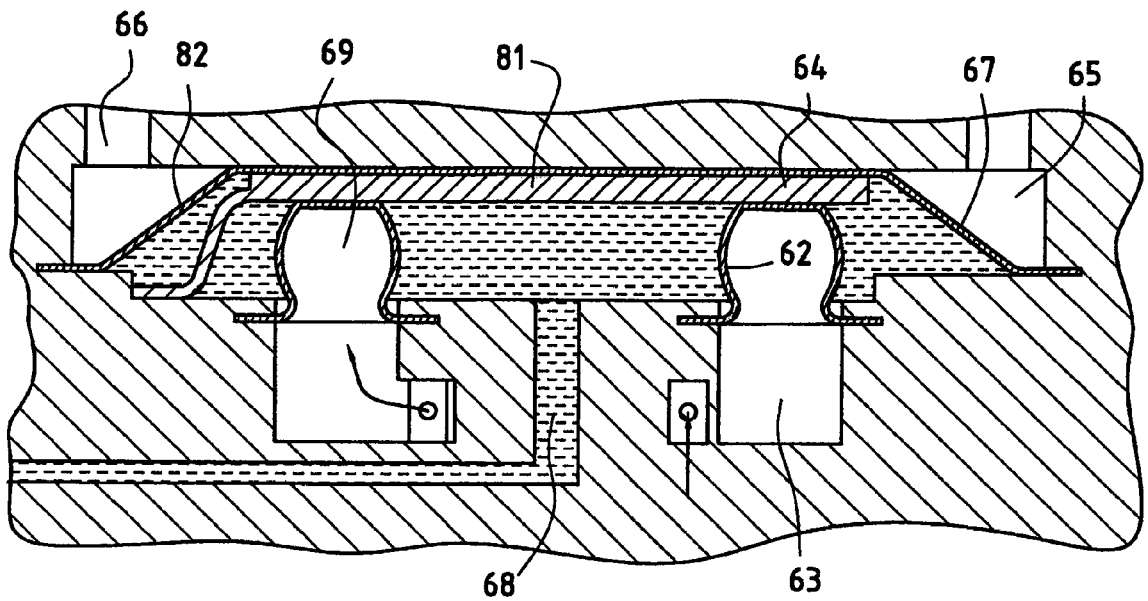
FIG. 9 is a longitudinal axial sectional view of the micropump of FIG. 7, the microactuator having operated.

The mode of operation of this type of vacuum micropump is as follows. Referring to FIGS. 7, 8 and 9, the combustion of the pyrotechnic charge generates gases that enter, via the four openings, the external groove 63 lined by the flexible membrane 62, which membrane immediately starts a phase of being turned inside out, so as to end up emerging from said groove 63 in which it was placed, in the form of a tire bead 69 shown in FIG. 9. The formation of this bead 69 results in the displacement of the disk 81 of the sheet 64. The displacement of said disk 81 is made possible thanks to the four S-shaped deformable strands 82 which stretch, without breaking, in order to remain connected to the annular band 80. Said displacement results in an intake of fluid into the space that the elastic membrane 67 creates upon moving away from the support 61. The elastic membrane 67 ensures the sealing of the space into which the fluid is drawn. The air in the space located behind the elastic membrane 67 is discharged via the two vents 66 of the open space 65, the volume of which does not stop decreasing.

Figure 10:
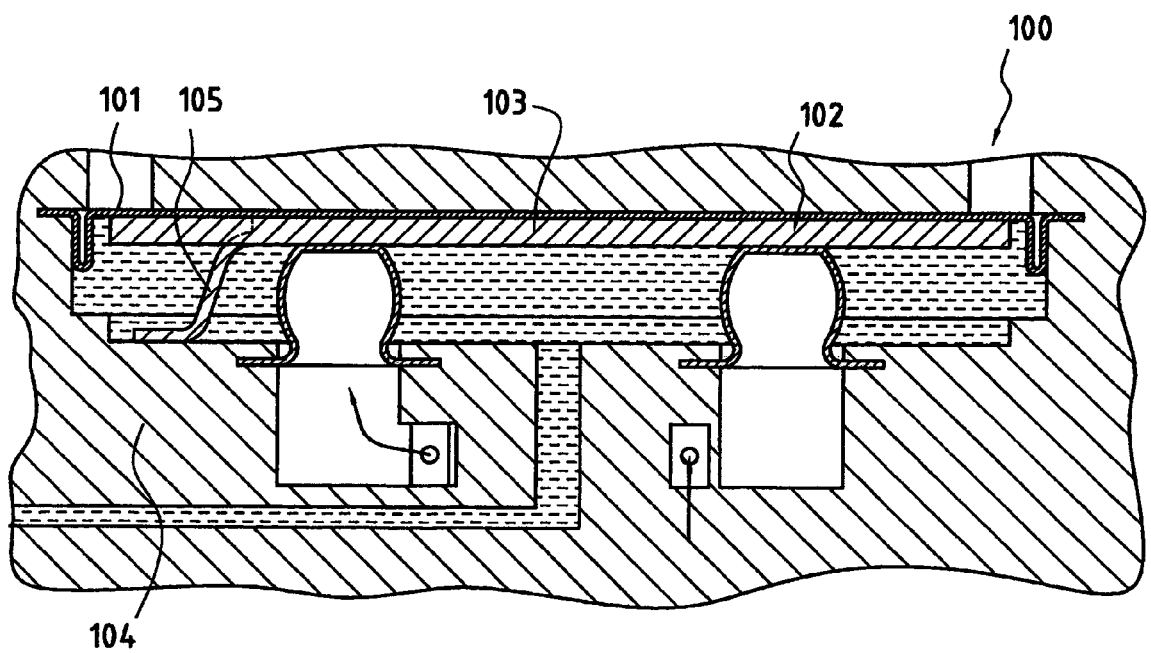
FIG. 10 is a longitudinal axial sectional view of a second embodiment of a micropump using a microactuator according to the invention, said microactuator having operated.

As shown in FIG. 10, a second embodiment of a micropump 100 using a microactuator according to the invention differs from the micropump described above only as regards the sheet 102 and membrane 101 that covers it. To be precise, the sheet 102 is in the form of a widened flat disk 103, the diameter of which is substantially equal to the cylindrical open space corresponding to that denoted by the reference 65 in FIG. 7 and located on the other side of said sheet 102. Said disk 103 is connected to the support 104 by means of four S-shaped deformable strands 105. In this way, the membrane 101 that covers the sheet 102 is fastened in said cylindrical open space so that it completely lines said space, both on the bottom and on the internal side wall. Said membrane 101 is fastened in said space at its side wall internal to its portion furthest away from said sheet 102. The operating principle of such a micropump 100 is similar to that described in the first embodiment. The technical advantage afforded by such a configuration is an increase in volume of the space into which the fluid is drawn, since this space is substantially that which exists beyond the sheet 102 before the microactuator is operated.

According to the invention, gas evacuation to the outside or to a secondary chamber of the type described with reference to FIG. 2 may also envisioned in these two embodiments of micropumps 40 and 100. In this case, a duct connects the annular chamber 63 to a secondary chamber. The duct is closed off during the first deformation of the membrane 62, causing fluid to be drawn in. According to the invention, gas evacuation to the outside or reduction in the gas pressure caused by the annular chamber being brought into communication with the secondary chamber will result in deflation of the membrane 62 and therefore a reduction in its deformation. Likewise, as in the embodiment shown in FIG. 2, if some of the gas is evacuated to a secondary chamber, a second pyrotechnic charge may be provided inside one of the chambers so as to obtain, after its initiation, a further deformation of the membrane 62. The initiation of the second pyrotechnic charge will create a further overpressure in the two communicating chambers and therefore a further inflation of the membrane 62 will be obtained. The inflation of the membrane 62 causes further intake of fluid into the space that the elastic membrane 67 creates upon moving away from the support 61. With these modifications, the micropump 40 and 100 will be capable of carrying out two successive intakes of liquid.

As described above, for both these embodiments of micropumps 40 and 100, it is also possible to provide a number of other chambers of the type of the secondary chamber 722, this number depending on the number of intakes that it is desired to perform.

The invention claimed is:

1. A microactuator comprising a chamber, called the main chamber, produced in a solid support and containing a pyrotechnic charge, called the main charge, said main chamber being hermetically sealed and bounded, on the one hand, by solid walls of the support and, on the other hand, by a deformable membrane, so that the gases emitted by the combustion of the main pyrotechnic charge cause the volume of said main chamber to increase by deforming said membrane, while leaving the solid walls of the main chamber intact, characterized in that said microactuator includes means for evacuating the gases from the main chamber.

2. The microactuator as claimed in claim 1, characterized in that the gas evacuation means can be actuated upon command.

3. The microactuator as claimed in claim 1, characterized in that the gas evacuation means comprise an evacuation duct that runs at one end into the main chamber and at another end to the outside of the support, the duct being initially closed off during deformation of the membrane, the evacuation means also including means for opening the duct that are actuated in order to allow evacuation of the gases via the duct from the main chamber to the outside of the support.

4. The microactuator as claimed in claim 1, characterized in that the gas evacuation means comprise at least one evacuation duct that runs at one end into the main chamber and at another end into another chamber, called the secondary chamber, which is hermetically sealed, the evacuation duct being initially closed off during deformation of the membrane, the evacuation means also including means for opening the duct, which are actuated in order to allow evacuation of the gases via the duct from the main chamber into the secondary chamber.

5. The microactuator as claimed in claim 3, characterized in that the evacuation duct is closed off by a plug.

6. The microactuator as claimed in claim 5, characterized in that the plug consists of a pyrotechnic charge.

7. The microactuator as claimed in claim 4, characterized in that another pyrotechnic charge, called the secondary pyrotechnic charge, is housed in one of the two chambers.

8. The microactuator as claimed in claim 7, characterized in that each of the pyrotechnic charges is deposited on a conductive heating track with a deposition thickness of less than 200 mm.

9. The microactuator as claimed in claim 7, characterized in that each of the pyrotechnic charges, main charge or secondary charge, may be in the form of a film covering a cavity hollowed in the support.

10. The microactuator as claimed in claim 1, characterized in that the support consists of a stack of several layers.

11. The microactuator as claimed in claim 6, characterized in that the pyrotechnic charges are formed by a nitrocellulose-based composition.

12. The microactuator as claimed in claim 1, characterized in that the volume of the main chamber is less than 1 cm$^3$.

13. The microactuator as claimed in claim 12, characterized in that the charging density, which is the ratio of the mass of the main pyrotechnic charge to the volume of the main chamber, is between 0.01 mg/mm$^3$ and 0.1 mg/mm$^3$.

14. The microactuator as claimed in claim 1, characterized in that the membrane is flexible and folded in said chamber, said membrane being capable of unfolding under the effect of the gases emitted by the pyrotechnic charge.

15. The microactuator as claimed in claim 1, characterized in that the membrane is made of Polytetrafluoroethylene.

16. A microsystem that includes a microactuator as claimed in claim 1, characterized in that it comprises a solid part, the deformation of the membrane causing displacement of the solid part.

17. The microsystem as claimed in claim 16, characterized in that the solid part pivots under the effect of the combustion gases and obstructs a fluid duct.

18. A microsystem that includes a microactuator as claimed in claim 1, characterized in that:

i) a flexible membrane is located in an annular space that can be likened to a groove and constitutes the main chamber;

ii) the pyrotechnic charge is located in an annular space that can be likened to a groove of smaller dimension than that in which the flexible membrane is located, and positioned concentrically with respect to the latter, the two grooves communicating with each other via at least one opening; and iii) a flat solid part bears against the support by covering the annular space in which the flexible membrane is located, said part being itself covered by an elastic membrane and obstructing a fluid duct, in such a way that the gases emitted by the combustion of the charge cause the flexible membrane located in the annular space to be deployed and cause the flat part to be displaced, resulting in fluid being drawn into the space that the elastic membrane creates when it moves away from the support.

19. A microsystem that includes a microactuator as claimed in claim 1, characterized in that the membrane deforms under the effect of the combustion gases, so as to close off a fluid duct.

20. A method of using a microactuator as defined in claim 3, in order to close or open a fluid microcircuit and then to open or close, respectively, a fluid microcircuit.

21. A method of using a microactuator as defined in claim 3, in order to close or open a fluid microcircuit, then to open or close, respectively, the fluid microcircuit and then to close again or open again, respectively, the fluid microcircuit.

* * * * *